US010354577B1

(12) United States Patent
Jepsen et al.

(10) Patent No.: US 10,354,577 B1
(45) Date of Patent: Jul. 16, 2019

(54) MASKING NON-FUNCTIONING PIXELS IN A DISPLAY

(71) Applicant: X Development LLC, Mountain View, CA (US)

(72) Inventors: Mary Lou Jepsen, Sausalito, CA (US); Nicholas C. Loomis, Oakland, CA (US); Behnam Bastani, San Jose, CA (US); Carlin Vieri, Menlo Park, CA (US); Colin Braley, Mountain View, CA (US); Stuart C. B. Abercrombie, Morgan Hill, CA (US)

(73) Assignee: X Development LLC, Mountain View, CA (US)

( * ) Notice: Subject to any disclaimer, the term of this patent is extended or adjusted under 35 U.S.C. 154(b) by 17 days.

(21) Appl. No.: 15/070,852

(22) Filed: Mar. 15, 2016

Related U.S. Application Data

(60) Provisional application No. 62/169,974, filed on Jun. 2, 2015.

(51) Int. Cl.

| | |
|---|---|
| ***H04N 5/367*** | (2011.01) |
| ***G09G 3/20*** | (2006.01) |
| ***G09G 3/3291*** | (2016.01) |
| ***G09G 3/36*** | (2006.01) |

(52) U.S. Cl.
CPC ......... *G09G 3/2074* (2013.01); *G09G 3/3291* (2013.01); *G09G 3/3607* (2013.01); *G09G 2310/0291* (2013.01); *G09G 2320/0233* (2013.01); *G09G 2320/0295* (2013.01); *G09G 2320/0646* (2013.01)

(58) Field of Classification Search
CPC ... G09G 2320/0295; G09G 2320/0233; H04N 5/367
See application file for complete search history.

(56) References Cited

U.S. PATENT DOCUMENTS

| | | | |
|---|---|---|---|
| 6,188,454 | B1 | 2/2001 | Greene et al. |
| 6,618,115 | B1 | 9/2003 | Hiroki |
| 6,680,761 | B1 | 1/2004 | Greene et al. |
| 7,256,550 | B2 | 8/2007 | Park et al. |
| 7,460,133 | B2 | 12/2008 | Messing et al. |
| 7,777,691 | B1 | 8/2010 | Nimmer et al. |

(Continued)

FOREIGN PATENT DOCUMENTS

| | | | |
|---|---|---|---|
| TW | 200410422 | A | 6/2004 |
| TW | I286241 | B | 9/2007 |

(Continued)

OTHER PUBLICATIONS

ISO 13406-2, Wikipedia, 2 pages, accessed Oct. 20, 2014.

*Primary Examiner* — Dennis P Joseph
(74) *Attorney, Agent, or Firm* — Christensen O'Connor Johnson Kindness PLLC

(57) ABSTRACT

A technique for masking a non-functioning pixel in a display screen includes receiving pixel values for driving pixels on the display screen with an image, identifying a sub-set of the pixel values associated with surrounding pixels that are adjacent to the non-functioning pixel in the display screen, and adjusting the pixel values of the sub-set to increase brightness of the surrounding pixels to compensate for lost brightness due to the non-functioning pixel to thereby mask visual perception of the non-functioning pixel.

13 Claims, 5 Drawing Sheets

(56) References Cited

U.S. PATENT DOCUMENTS

| | | | | |
|---|---|---|---|---|
| 7,948,672 | B2 | 5/2011 | Sampsell | |
| 8,013,816 | B2 | 9/2011 | Kim | |
| 8,036,456 | B2 | 10/2011 | Stellbrink | |
| 8,164,598 | B2 | 4/2012 | Kimpe | |
| 8,390,532 | B2 | 3/2013 | Hanamura et al. | |
| 9,030,375 | B2 | 5/2015 | Curtis et al. | |
| 2004/0051944 | A1 | 3/2004 | Stark | |
| 2004/0114084 | A1 | 6/2004 | Kim et al. | |
| 2004/0263648 | A1* | 12/2004 | Mouli | H04N 5/335 348/243 |
| 2005/0179675 | A1 | 8/2005 | Hekstra et al. | |
| 2006/0012733 | A1 | 1/2006 | Jin et al. | |
| 2006/0055864 | A1 | 3/2006 | Matsumura et al. | |
| 2007/0132778 | A1 | 6/2007 | Gallen et al. | |
| 2008/0063256 | A1* | 3/2008 | Stellbrink | G06T 5/005 382/149 |
| 2009/0079681 | A1 | 3/2009 | Chang et al. | |
| 2010/0177261 | A1 | 7/2010 | Jin et al. | |
| 2012/0120007 | A1 | 5/2012 | Choi et al. | |
| 2012/0256534 | A1 | 10/2012 | Lee et al. | |
| 2012/0281123 | A1* | 11/2012 | Hoda | H04N 5/3675 348/246 |
| 2013/0093646 | A1 | 4/2013 | Curtis et al. | |
| 2013/0135589 | A1 | 5/2013 | Curtis et al. | |
| 2013/0141595 | A1* | 6/2013 | Cho | H04N 5/3675 348/207.1 |
| 2013/0236104 | A1* | 9/2013 | Lee | G06T 7/0042 382/195 |
| 2015/0138755 | A1 | 5/2015 | Bastani et al. | |
| 2017/0026597 | A1* | 1/2017 | Cao | H04N 5/367 |

FOREIGN PATENT DOCUMENTS

| | | | |
|---|---|---|---|
| TW | 201117376 | A | 5/2011 |
| WO | 2008/022464 | A1 | 2/2008 |
| WO | 2014/070684 | A1 | 5/2014 |

* cited by examiner

UNMASKED

MASKED

MASKING NON-FUNCTIONING PIXELS IN A DISPLAY

CROSS-REFERENCE TO RELATED APPLICATIONS

This application claims priority under the provisions of 35 U.S.C. § 119(e) to U.S. Provisional Application No. 62/169,974, filed Jun. 2, 2015.

TECHNICAL FIELD

This disclosure relates generally to display technologies, and in particular but not exclusively, relates to display technologies with non-functioning pixels.

BACKGROUND INFORMATION

During manufacture of display screens, the display screens are inspected for various flaws. Those which fail quality control testing are often relegated to a trash heap or saved for applications, which have lower quality requirements. Consumer grade electronics generally require high quality displays to pass all quality control inspections, which leads to reduced yields and increased costs due to minor flaws.

One common flaw type is a non-functioning pixel, which includes bright pixels (e.g., hot pixels) and dark pixels (e.g., dead pixels). In a liquid crystal display ("LCD"), bright pixels are pixels with a defect that causes the liquid crystal material to always transmit light through the pixel. Dark pixels are pixels with a defect that causes the liquid crystal material to always block light from passing through the pixel.

The ISO-13406-2 Standard specifies defect classes, which define the number and type of defective pixels permissible in each class type. For example, many display manufactures specify their displays as pixel fault class II, which means two or less hot or dead pixels per million pixels. These strict fault standards reduce display yields at each pixel fault class. Methods exist for trying to fix non-functioning pixels, such as targeting individual pixels for additional processing (for example, laser etching away electrical shorts), but can introduce substantial additional costs into the manufacturing flow.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and method for masking non-functioning pixels are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The techniques describe herein effectively mask or hide non-functioning pixels (e.g., dark pixels) perceptible by a viewer thereby improving the user experience with a display having one or more non-functioning pixels. These techniques potentially enable certain display screens that otherwise would be discarded to be put to good use, or enable display screens that otherwise would be relegated to lower class uses to be used for higher class uses such as consumer grade products.

Figure 1:
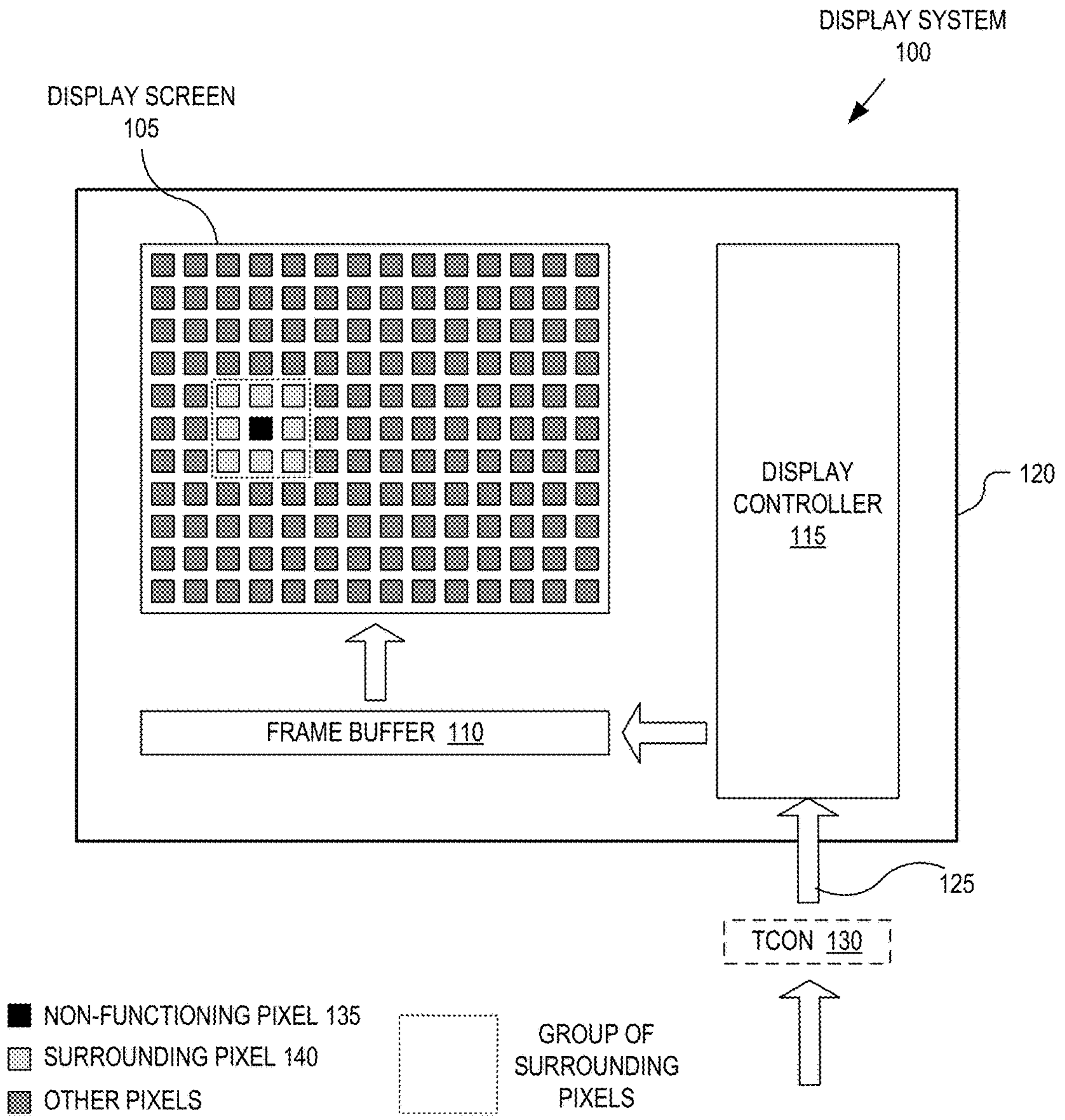
FIG. 1 is a functional block diagram illustrating a display system that masks non-functioning pixels on a display screen by increasing the brightness of surrounding pixels, in accordance with an embodiment of the disclosure.

FIG. 1 is a functional block diagram illustrating a display system 100 that masks or otherwise reduces the visual perception of dark pixels on a display screen by increasing the brightness of surrounding pixels, in accordance with an embodiment of the disclosure. The illustrated embodiment of display system 100 includes a display screen 105, a frame buffer 110, a display controller 115, a display panel 120, and an input port 125. In one embodiment, display system 100 optionally includes an externally connected timing connector ("TCON") 130. In the illustrated embodiment, display screen 105 includes one non-functioning pixel 135 (e.g., dark or dead pixel), which is adjacent to surrounding pixels 140 that are operational.

The techniques described herein are applicable to mask dark pixels in virtually any type of display screen technology including, but not limited to, backlit/front-lit displays (e.g., liquid crystal displays ("LCD"), liquid crystal on silicon ("LCoS") displays, etc.), active emission displays (e.g., light emitting diode ("LED") displays, organic LED ("OLED") displays, etc.), or otherwise. These techniques increase the brightness of surrounding pixels 140 to compensate for the lost brightness output from non-functioning pixel 135. The term "brightness" is defined broadly herein to incorporate the concepts of luminous intensity (visible light energy perceived by the human eye in a given direction), luminance (visible light energy perceived by the human eye in a given direction, per unit area), or luminous flux (absolute visible light output from a given source). Accordingly, "lost brightness" means a reduction in any one of luminous intensity, luminance, or luminous flux. Similarly, "increasing brightness" means an increase in any one of luminous intensity, luminance, or luminous flux. The lost brightness of non-functioning pixel 135 is the lumens that are not output by non-functioning pixel 135 due to its non-functioning state (e.g., dark state). By estimating this lost brightness and increasing the brightness of surrounding pixels 140, the dark spot created by non-functioning pixel 135 is less noticeable and therefore human perception of the non-functioning pixel is reduced (i.e., perception of a dark pixel is masked).

Figure 2A:
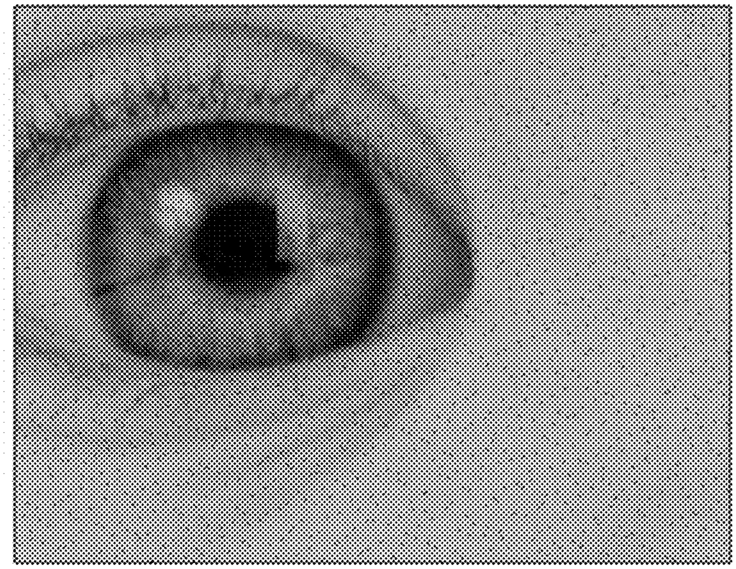
FIGS. 2A & 2B illustrate an image with many dark pixels and the same image with the masking technique applied to visually mask perception of those dark pixels, in accordance with an embodiment of the disclosure.
Figure 2B:
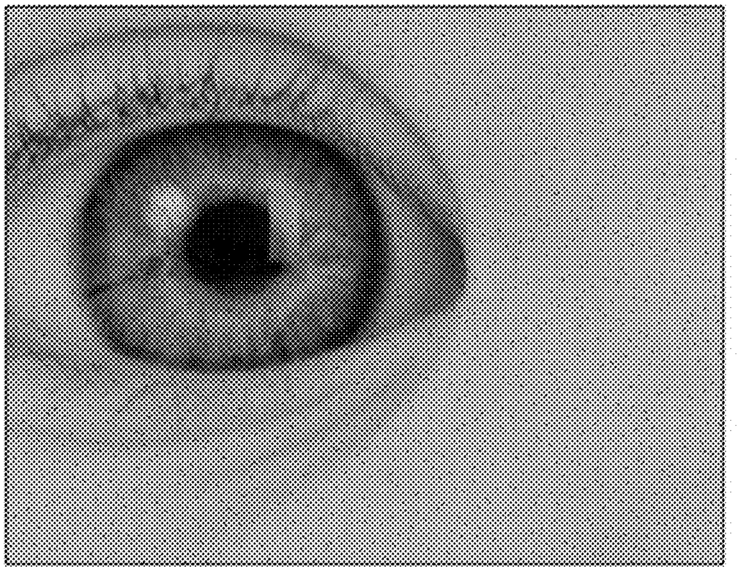

FIGS. 2A & 2B both illustrate the same image with many simulated dark pixels (e.g., dark spots). FIG. 2A illustrates the unmasked image—the many dark spots are readily apparent. FIG. 2B illustrates the same image but is displayed using one of the techniques described below to mask the visual perception of these dark pixel spots. By increasing the brightness of functioning pixels surrounding each dark pixel spot, the dark pixel spots become less noticeable. Of course, FIGS. 2A and 2B are exaggerated examples as a real display with the number of dark pixels that are simulated in FIGS. 2A and 2B is highly unlikely.

Figure 3:
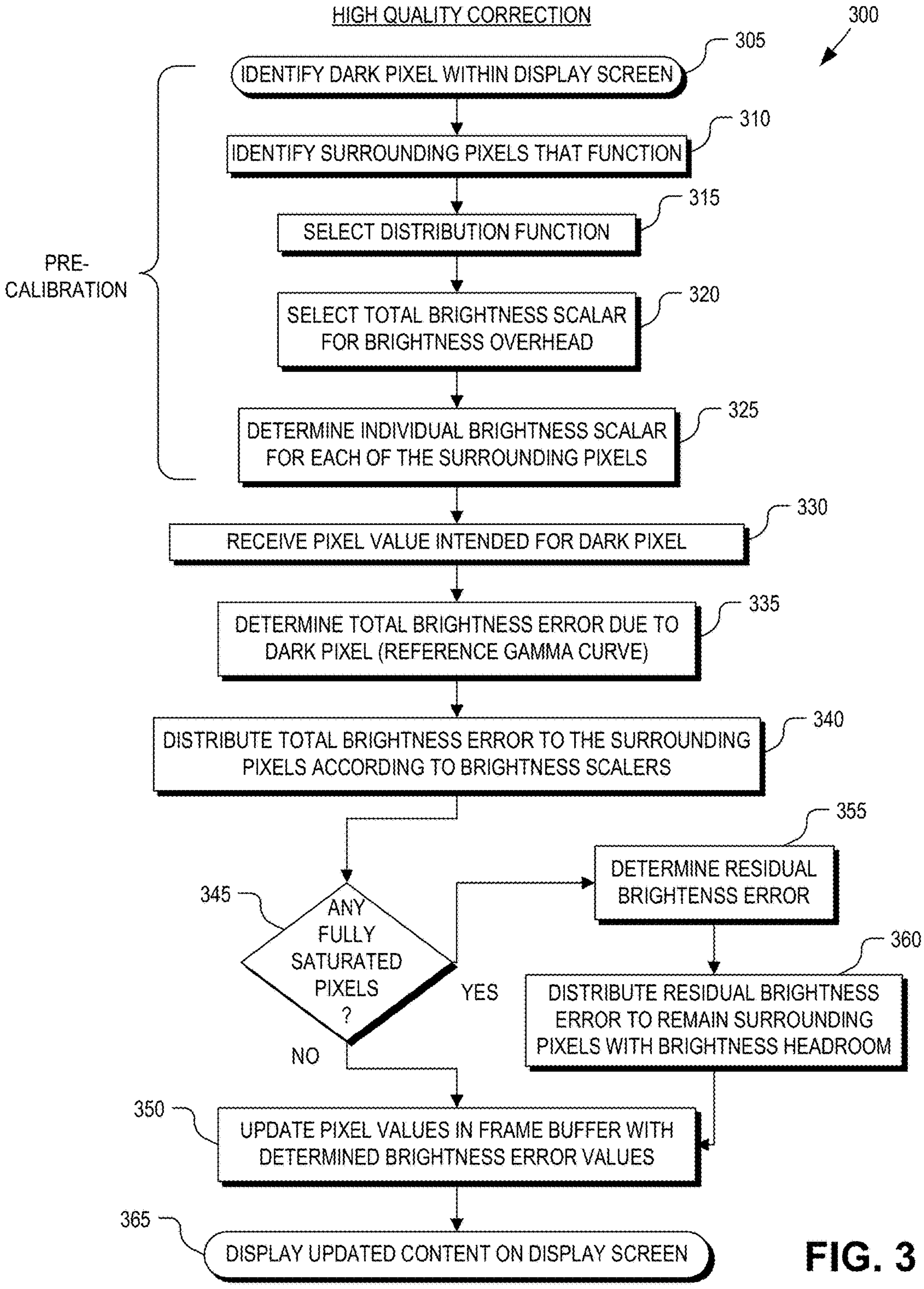
FIG. 3 is a flow chart illustrating a procedure for visually masking perception of a dark pixel within a display screen, in accordance with an embodiment of the disclosure.

FIG. 3 is a flow chart illustrating a process 300 for visually masking perception of non-functioning pixel 135 within display screen 105, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Process 300 represents a high quality correction technique, which attempts to accurately determine the amount of lost brightness or total brightness error due to non-functioning pixel 135. This technique analyzes each pixel value received for display by a non-functioning pixel 135 and generates an appropriate total brightness error. Thus, if a pixel value for a non-functioning pixel 135 of a given image frame is supposed to be dark or black, then the total brightness error for that frame may be computed to be zero and thus require no compensation for surrounding pixels 140. On the other hand, if a pixel value for non-functioning pixel 135 of another image frame is supposed to have some level of lumen output (brightness), then process 300 attempts to accurately estimate the total brightness error and apply additional brightness to surrounding pixels 140 to mask the visual defect. It is anticipated that many alternative techniques for deciding how much brightness, if any, to add to surrounding pixels 140 may be used than just those described below and are thus considered to be within the general scope and spirit of this disclosure.

In various embodiments, process 300 may be executed by logic within display controller 115, TCON 130, or other logic units (not illustrated) within display system 100. TCON 130 is an externally attached device that can identify the timing of data bits streaming into a display panel, identify pixel values associated with specific display pixels, and alter those pixel values as described herein. In one embodiment, TCON 130 may be an intelligent adapter that further provides a user interface to facilitate the identification and tagging of non-functioning pixels by an end user.

In process block 305, one or more non-functioning pixels 135 (e.g., dark pixels) are identified within display screen 105. In one embodiment, this identification process occurs at the time of fabrication within a factory. A number of techniques may be used to identify a dark pixel including human inspection or automated inspection using a high resolution camera that views display screen 105 while one or more test images are displayed. In another embodiment, a user interface may be provided to aid an end user with the identification and tagging of dark pixels. For example, the user may enter display screen 105 into a calibration mode where a user can move a visual marker around the screen to select individual pixels. This later technique enables end users to mask non-functioning pixels in the field over the lifetime of display screen 105.

Figure 4A:
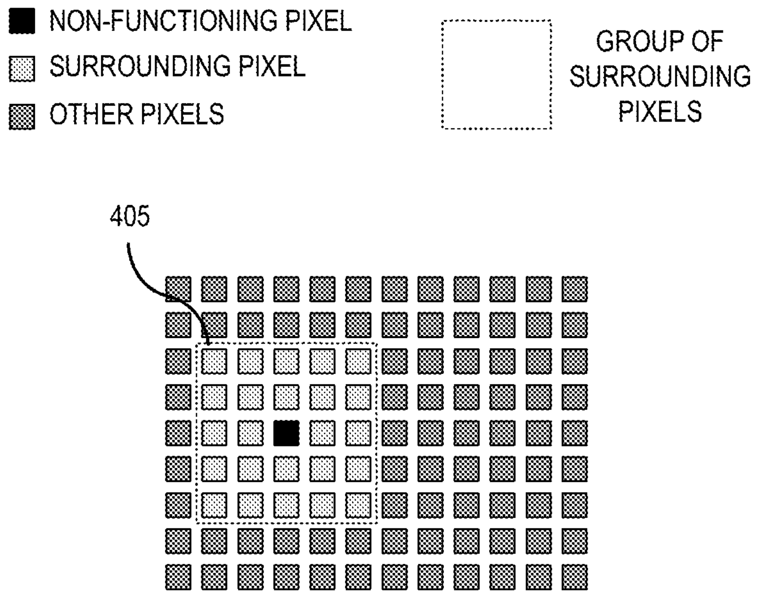
FIGS. 4A & 4B illustrate different examples of identifying surrounding pixels disposed about one or more dark pixels, in accordance with embodiments of the disclosure.
Figure 4B:
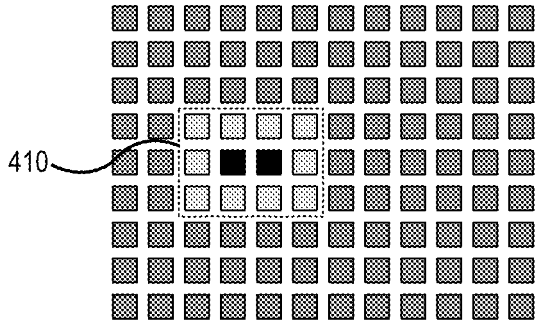

Once non-functioning pixel 135 has been identified, surrounding pixels 140 that function in the vicinity of non-functioning pixel 135 are also identified (process block 310). FIG. 1 illustrates surrounding pixels 140 being the immediately adjacent pixels to non-functioning pixel 135. However, in various embodiments, the identified surrounding pixels may include more pixels than just the immediately adjacent pixels. For example, FIG. 4A illustrates an embodiment where surrounding pixels 405 include not only the immediately adjacent pixels to the non-functioning dark pixel, but also includes neighboring pixels surrounding the immediately adjacent pixels. Accordingly, the surrounding pixels may include multiple layers (rows or columns) of functioning pixels that surround the dark pixel. FIG. 4B illustrates an example where two dark pixels are clustered together. Surrounding pixels 410 include the functioning pixels that encircle the dark cluster.

Returning to FIG. 3, in a process block 315, a distribution function for apportioning additional brightness to surrounding pixels 140 is selected. The distribution function determines how the lost brightness or lost lumens due to non-functioning pixel 135 (referred to herein as total brightness error) should be allocated amongst surrounding pixels 140. In one embodiment, the distribution function simply apportions the total brightness error in equal parts. In one embodiment, the distribution function apportions the total brightness error based upon proximity by favoring surrounding pixels 140 that are closer to non-functioning pixel 135 (i.e., allocating larger portions to closer surrounding pixel than compared to further surrounding pixels). In one embodiment, the distribution function apportions the total brightness error based upon orientation of the surrounding pixel relative to non-functioning pixel 135. For example, diagonal pixels may be favored to receive an additional allotment of the total brightness error, since the human eye has greater perception of horizontal or vertical lines. In yet other embodiments, various combinations of the above distribution functions may be implemented (e.g., total brightness error is divided equally, then biased for both proximity and orientation). Other linear or non-linear distribution functions may be implemented.

In a process block 320, a total brightness scalar is selected. The total brightness scalar is a multiplier that is applied to increase the total brightness error providing additional brightness overhead to the estimated lost brightness. In some cases, the addition of a small multiplier (e.g., 5%, etc.) has been found to help further mask dark pixels. In some embodiments, the total brightness scalar may be assigned a value of unity so that no additional brightness compensation is applied over that which is estimated to be lost due to non-functioning pixel 135.

With the distribution function and total brightness scalar selected and the surrounding pixels 140 identified, an individual brightness scalar can be computed for each of the surrounding pixels 140. In this embodiment, this scalar is a pre-computed value for each surrounding pixel and is stored in association with a given surrounding pixel 140. During runtime operation (i.e., while displaying images on display screen 105), the individual brightness scalars are used to determine the portion of the total brightness error that is to be allocated to the various surrounding pixels 140. It should be noted that in process 300, the total brightness error associated with a given non-functioning pixel 135 is recomputed for each image frame.

In a process block 330, a pixel value associated with non-functioning pixel 135 is received for a given image frame. In one embodiment, it is received into frame buffer 110 where display controller 115 performs its operations prior to pushing the image data to display screen 105. In other embodiments, the runtime processing may be performed further upstream within display controller 115 or even within an externally attached intelligent TCON 130 that operates on the bit stream prior to the bit stream reaching input port 125.

With the pixel value for non-functioning pixel 135 in-hand, the total brightness error due to non-functioning pixel 135 is computed (process block 335). In one embodiment, the total brightness error is determined by referencing a gamma curve for display screen 105. The gamma curve for display screen 105 is typically a nonlinear function that decodes the luminance value of a display pixel from its pixel value or bit value in the data stream. In one embodiment, the lost brightness or total brightness error is scaled using the total brightness scalar to add brightness overhead (if any), as described in connection with process block 320.

In a process block 340, the total brightness error is distributed as additional brightness among surrounding pixels 140 using the individual brightness scalars determined in process block 325. If the brightness added to any of surrounding pixels 140 does not result in a fully saturated pixel (decision block 345), then process 300 continues to a process block 350. In process block 350, display controller 115 (or other logic unit) updates the pixel values of the various surrounding pixels 140 in frame buffer 110.

However, if the brightness added to any of surrounding pixels 140 will result in a saturated pixel, then process 300 continues to a process block 355. In process block 355, a residual brightness error is calculated. The residual brightness error is that portion of the total brightness error that remains uncompensated due to saturation of one or more of surrounding pixels 140. In this event, the residual brightness error is re-distributed to the remaining surrounding pixels 140 with brightness headroom (i.e., pixels that have not saturated). Again, process 300 returns to process block 350 where the pixel values of surrounding pixels 140 are updated to reflect the additional brightness apportioned from non-functioning pixel 135.

Finally, in a process block 365, the pixel values, including the updated pixel values for surrounding pixels 140, are loaded into display screen 105 to display the frame image. As mentioned above, process 300 represents a high accuracy correction for one or more non-functioning pixels that uses real-time processing to determine the total brightness error associated with the pixel value destined for the non-functioning pixel. However, less computationally intensive techniques may also be used to provide adequate masking of dead or dark pixels.

Figure 5:
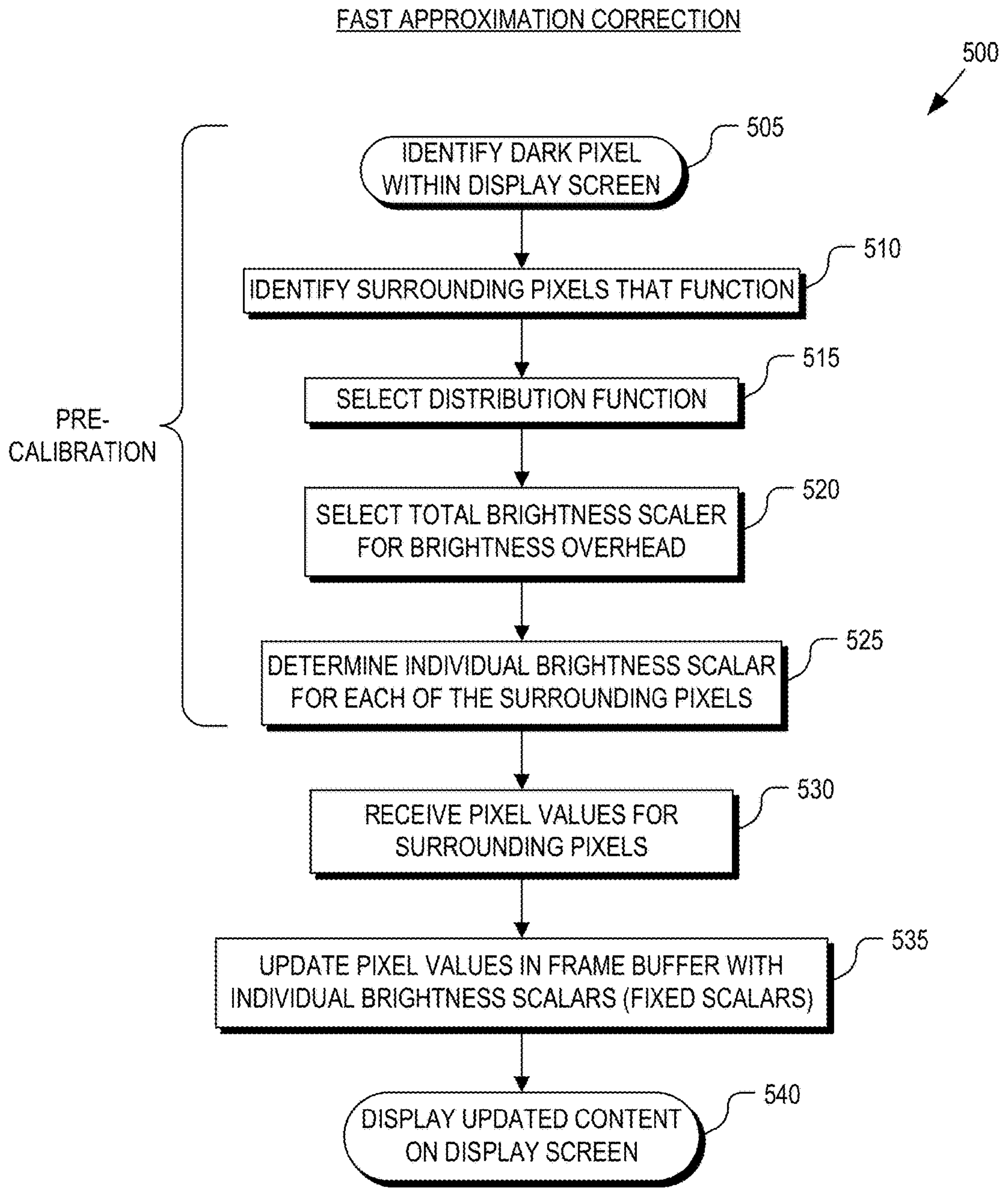
FIG. 5 is a flow chart illustrating a procedure for visually masking perception of a dark pixel within a display screen, in accordance with another embodiment of the disclosure.

FIG. 5 is a flow chart illustrating a procedure 500 for visually masking perception of non-functioning pixel 140 within display screen 105 using a fast approximation correction, in accordance with another embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

The illustrated embodiment of process 500 includes a pre-calibration phase, including process blocks 505-525, that is similar to the pre-calibration phase of process 300. In one embodiment, process blocks 505-525 correspond to process blocks 305-325 of process 300, respectively.

Once process 500 reaches process block 530, the pixel values for surrounding pixels 140 of a given frame are received. In one embodiment where the dark pixel masking functionality is integrated into a display panel and executed by display controller 115, the pixel values are received into frame buffer 110. In another embodiment, where the dark pixel masking functionality is executed external to a display panel, the pixel values are received at TCON 130.

In a process block 535, the individual brightness scalars are applied to the pixel values of surrounding pixels 140 to increase their brightness. Thus, process 500 does not attempted to calculate the amount of lost brightness due to non-functioning pixel 135 and then apportion this brightness to surrounding pixels 140 for each frame. Rather, process 500 assumes that the brightness of non-functioning pixel 135 will be similar to the brightness of surrounding pixels 140 and applies fixed scalars (the individual brightness scalars determined in process block 525) to the pixel values of surrounding pixels 140 to increase the brightness of surrounding pixels 140. These fixed scalar values can be determined in the manner described above providing preferences based upon proximity and orientation. In other embodiments, the fixed scalars may simply be greater than unity multipliers, or additive padding values, that increase the brightness figures of surrounding pixels 140 and need not be calculated using the techniques described above. For example, the fixed scalar values may be based upon trial and error testing for different categories or types of displays.

Finally, in a process block 540, the pixel values, including the updated pixel values for surrounding pixels 140, are loaded into display screen 105 to display the frame image. Process 500 provides a less computationally intensive technique for masking dark pixels. Process 500 may be well suited as a generic compensation technique that can be applied externally via an intelligent TCON 130 to most types of display panels.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for masking a non-functioning pixel in a display screen, the method comprising:

receiving pixel values for driving pixels on the display screen with an image;

identifying a sub-set of the pixel values associated with surrounding pixels that are adjacent to the non-functioning pixel in the display screen;

selecting between a high-quality correction or a fast approximation correction; and adjusting the pixel values of the sub-set to increase brightness of the surrounding pixels to compensate for lost brightness due to the non-functioning pixel to thereby mask visual perception of the non-functioning pixel, wherein the pixel values of the sub-set of the pixel values are adjusted according to the selected high-quality correction or the fast approximation correction, wherein the high-quality correction includes:

determining a total brightness error associated with the lost brightness of the non-functioning pixel; and determining whether distribution of the total brightness error to the surrounding pixels will cause one or more of the surrounding pixels to saturate; and if one or more of the surrounding pixels saturates, then:

determining a residual brightness error of the total brightness error that remains uncompensated due to saturation; and distributing the residual brightness error to a remainder of the surrounding pixels that have not saturated, wherein the fast approximation correction includes:

applying individual brightness scalars to the pixel values of the sub-set associated with the surrounding pixels, wherein each of the individual brightness scalars comprises a pre-determined individual brightness scalar for each of the surrounding pixels that are pre-determined prior to receiving the pixel values.

2. The method of claim 1, wherein the surrounding pixels comprise immediately adjacent pixels to the non-functioning pixel and neighboring pixels surrounding the immediately adjacent pixels.

3. The method of claim 1, wherein adjusting the pixel values of the sub-set of the pixel values comprises:

adjusting the pixel values of the sub-set of the pixel values within a frame buffer.

4. The method of claim 1, wherein adjusting the pixel values of the sub-set of the pixel values comprises:

adjusting the pixel values of the sub-set of the pixel values in a bit stream prior to the bit stream being delivered to an input of the display screen, wherein the adjusting of the pixel values is performed in real-time external to the display screen.

5. The method of claim 1, wherein adjusting the pixel values of the sub-set of the pixel values comprises:

adjusting the pixel values of the sub-set based at least in part upon a distribution function that apportions additional brightness to the surrounding pixels based upon proximity by allocating larger portions of the additional brightness to the surrounding pixels that are closer to the non-functioning pixel than compared to the surrounding pixels that are further from the non-functioning pixel.

6. The method of claim 1, wherein the total brightness error associated with the lost brightness of the non-functioning pixel includes a brightness overhead that exceeds the lost brightness due to the non-functioning pixel.

7. The method of claim 1, wherein determining the total brightness error associated with the lost brightness of the non-functioning pixel comprises:

referencing a gamma curve of the display screen using the pixel value received for the non-functioning pixel.

8. A non-transitory machine-accessible storage media that provides instructions that, when executed by a machine, will cause the machine to perform operations comprising:

receiving pixel values for driving pixels on a display screen with an image;

identifying a sub-set of the pixel values associated with surrounding pixels that are adjacent to a non-functioning pixel in the display screen;

selecting between a high-quality correction or a fast approximation correction; and adjusting the pixel values of the sub-set to increase brightness of the surrounding pixels to compensate for lost brightness due to the non-functioning pixel to thereby mask visual perception of the non-functioning pixel, wherein the pixel values of the sub-set of the pixel values are adjusted according to the selected high-quality correction or the fast approximation correction, wherein the high-quality correction includes:

determining a total brightness error associated with the lost brightness of the non-functioning pixel, wherein the total brightness error is distributed to the surrounding pixels and includes a brightness overhead that exceeds the lost brightness due to the non-functioning pixel;

determining whether the distribution of the total brightness error to the surrounding pixels will cause one or more of the surrounding pixels to saturate; and if one or more of the surrounding pixels saturates, then:

determining a residual brightness error of the total brightness error that remains uncompensated due to saturation; and distributing the residual brightness error to a remainder of the surrounding pixels that have not saturated, wherein the fast approximation correction includes:

applying individual brightness scalars to the pixel values of the sub-set associated with the surrounding pixels, wherein each of the individual brightness scalars comprises a pre-determined individual brightness scalar for each of the surrounding pixels that are pre-determined prior to receiving the pixel values.

9. The non-transistory machine-accessible storage media of claim 8, wherein the surrounding pixels comprise immediately adjacent pixels to the non-functioning pixel and neighboring pixels surrounding the immediately adjacent pixels.

10. The non-transistory machine-accessible storage media of claim 8, wherein adjusting the pixel values of the sub-set of the pixel values comprises:

adjusting the pixel values of the sub-set of the pixel values within a frame buffer.

11. The non-transistory machine-accessible storage media of claim 8, wherein adjusting the pixel values of the sub-set of the pixel values comprises:

adjusting 8 pixel values of the sub-set of the pixel values in a bit stream prior to the bit stream being delivered to an input of the display screen, wherein the adjusting of the pixel values is performed in real-time external to the display screen.

12. The non-transistory machine-accessible storage media of claim 8, wherein adjusting the pixel values of the sub-set of the pixel values comprises:

adjusting the pixel values of the sub-set based at least in upon a distribution function that apportions additional brightness to the surrounding pixels based upon proximity of the surrounding pixels to the non-functioning pixel.

13. The non-transistory machine-accessible storage media of claim 12, wherein the distribution function also apportions the additional brightness to the surrounding pixels based upon whether the surrounding pixels are located diagonally to the non-functioning pixel.

* * * * *